Nov. 11, 1952   F. M. JONES   2,617,340
POWER ROTATED DISK PLOW
Filed Dec. 14, 1949   3 Sheets-Sheet 1

Inventor
Frederic M. Jones
By John N. Randolph
Attorney

Nov. 11, 1952  F. M. JONES  2,617,340
POWER ROTATED DISK PLOW
Filed Dec. 14, 1949  3 Sheets-Sheet 2

Inventor
Frederic M. Jones
By John N. Randolph
Attorney

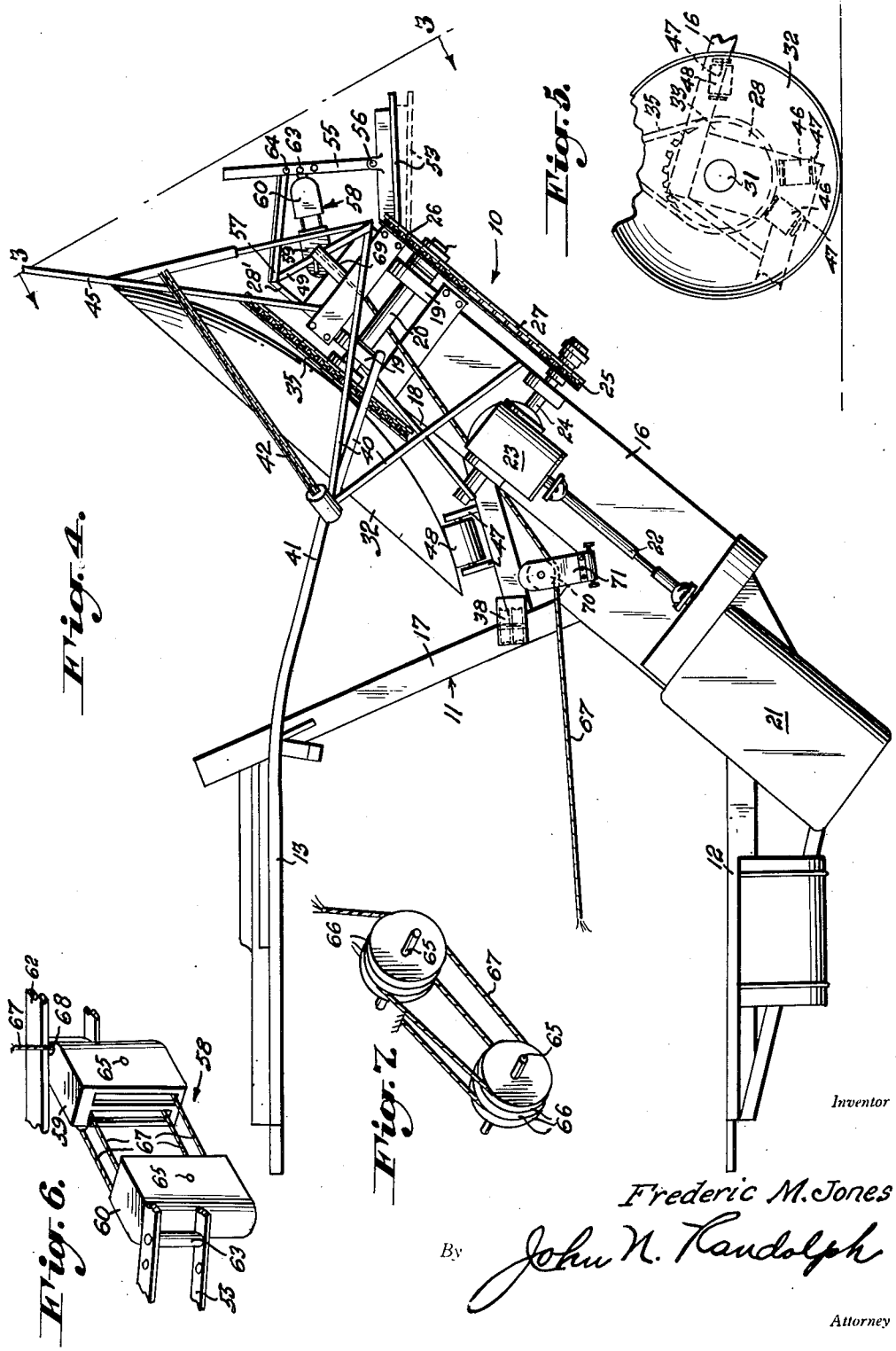

Patented Nov. 11, 1952

2,617,340

UNITED STATES PATENT OFFICE 2,617,340

POWER ROTATED DISK PLOW

Frederic M. Jones, Oceanside, Calif., assignor of one-half to Louis A. Magee, Oceanside, Calif.

Application December 14, 1949, Serial No. 132,897

8 Claims. (Cl. 97—37)

1

This invention relates to a novel construction of disk plow adapted to be attached to a tractor or other suitable prime mover and which includes a driven disk of sufficient size for plowing to a depth of approximately three and one-half feet to five feet and for forming a furrow three to five feet wide whereby deep plowing and soil reclamation may be accomplished much more rapidly and at much less cost than with conventional equipment.

More particularly, it is an aim of the present invention to provide a deep plowing unit including a frame adapted to be pivotally supported on a tractor or similar prime mover and provided with means for revolving a large disk blade in the direction of travel of the unit and at a speed greater than the speed of movement of the prime mover and unit whereby the driven disk blade in forming a furrow will tend to propel the unit in a forward direction to reduce the load on the tractor or prime move.

Still a further object of the invention is to provide a driven disk plow having a novel steering means forming a part thereof and adapted to engage the earth for cooperation with the disk blade in steering the unit and the tractor or prime mover to which it is connected and independently of the conventional steering mechanism of the tractor or prime mover.

Various other objects and advantages of the invention will hereinafter become more fully apparent from the following description of the drawings, illustrating a presently preferred embodiment thereof, and wherein:

Figure 4 is a top plan view of the unit;

Figure 5 is a fragmentary side elevational view, on a reduced scale, looking toward the outer, concave side of the disk;

Figure 6 is an enlarged fragmentary perspective view of the control unit of the steering mechanism;

Figure 7 is a perspective view of the internal parts of said control unit, and

2

Figures 1, 8:
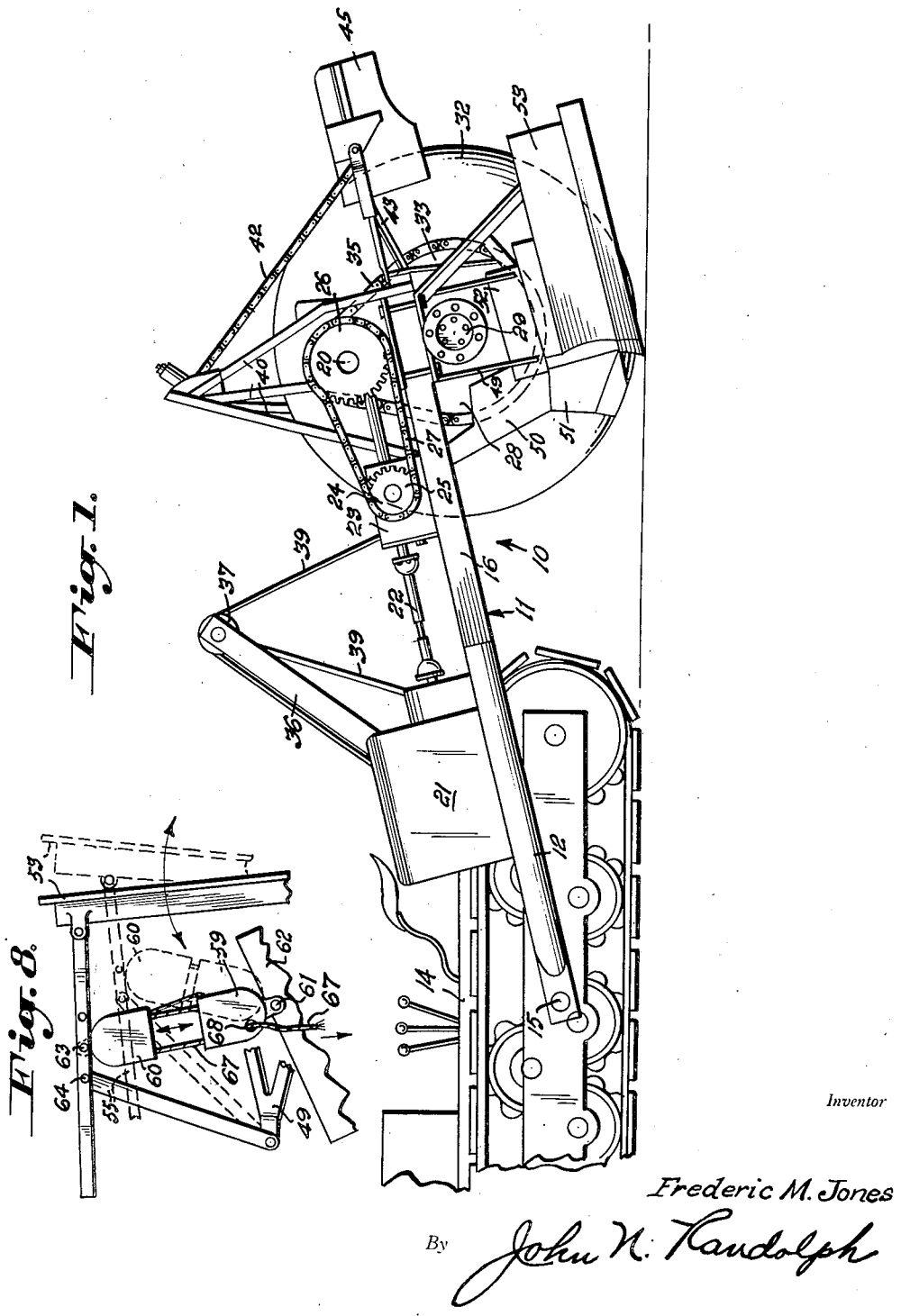
Figure 1 is a side elevational view of the power rotated disk plow unit shown mounted on a tractor or prime mover.
Figure 8 is a fragmentary horizontal sectional view taken substantially along a plane as indicated by the line 8—8 of Figure 3.
Figure 2:
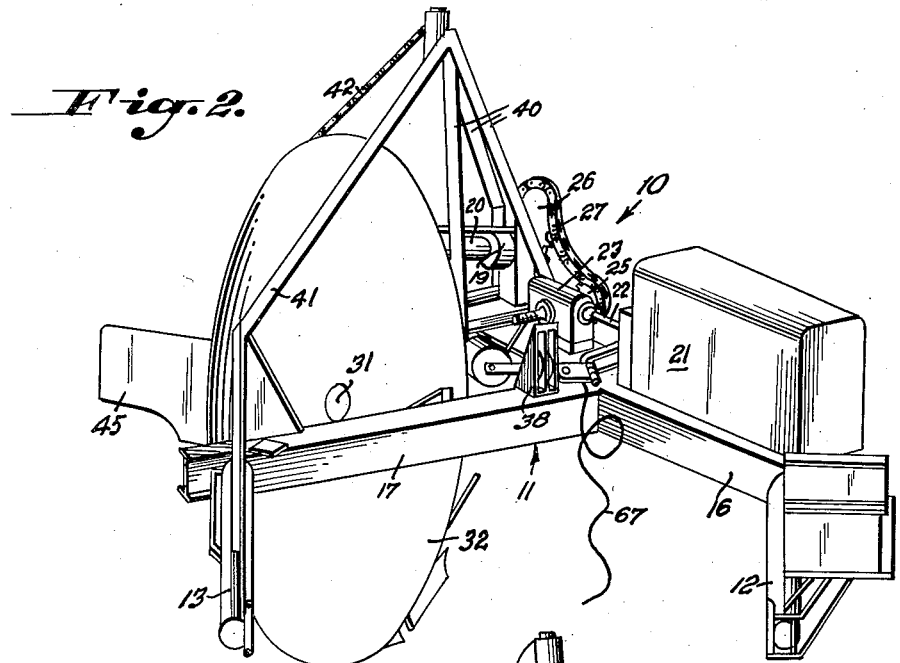
Figure 2 is a front elevational view, on an enlarged scale, of the unit.

Referring more specifically to the drawings, the power driven disk plow unit in its entirety is designated generally 10 and includes a frame, designated generally 11 and which is best illustrated in Figures 2 and 4. The frame 11 includes transversely spaced supporting arms 12 and 13 which constitute the forward end of said frame 11 and which are adapted to straddle the rear end portion of a prime mover, such as a tractor 14, the rear end of which has been illustrated in Figure 1 to illustrate a preferred application of the unit 10. The tractor 14 is provided with transversely aligned trunnions 15 which project laterally from opposite sides thereof and on which the arms 12 and 13 are detachably journaled adjacent their forward, free ends.

The frame 11 also includes a platform 16 which is secured adjacent its forward end to the rear end portion of the frame arm 12 and which extends rearwardly and diagonally therefrom in a direction transversely across the frame 11. The platform 16 is also supported by the frame arm 13 by means of a brace 17 which extends diagonally between the intermediate portion of the platform 16 and the rear end of the arm 13.

The platform 16 is provided with a recessed inner edge portion 18 extending from intermediate of its ends to its rear end. A pair of bearings 19 is supported on the platform 16, near its rear end and in transverse alignment and provides a journal for a relatively large countershaft or axle 20. An internal combustion engine 21 is supported on and secured to the forward end of the platform 16 and has a driven shaft 22 which extends therefrom rearwardly of the platform 16 and toward the countershaft 20. A gear box 23 is mounted on the platform 16 intermediate of its ends and provides a journal for the opposite, rear end of the drive shaft 22 and for a shaft 24 which extends transversely from said gear box 23. The adjacent ends of the shafts 22 and 24 are adapted to be connected by beveled gears, not shown, within the gear box 23 and so that the shaft 24 will be driven at a reduced speed relatively to the shaft 22. A small sprocket wheel 25 is fixed to the shaft 24 outwardly of the outer edge of the platform 16 and in alignment with a larger sprocket wheel 26 which is fixed to the complementary end of the countershaft or axle 20. The sprocket wheels 25 and 26 are connected by an endless sprocket chain 27.

Figure 3:
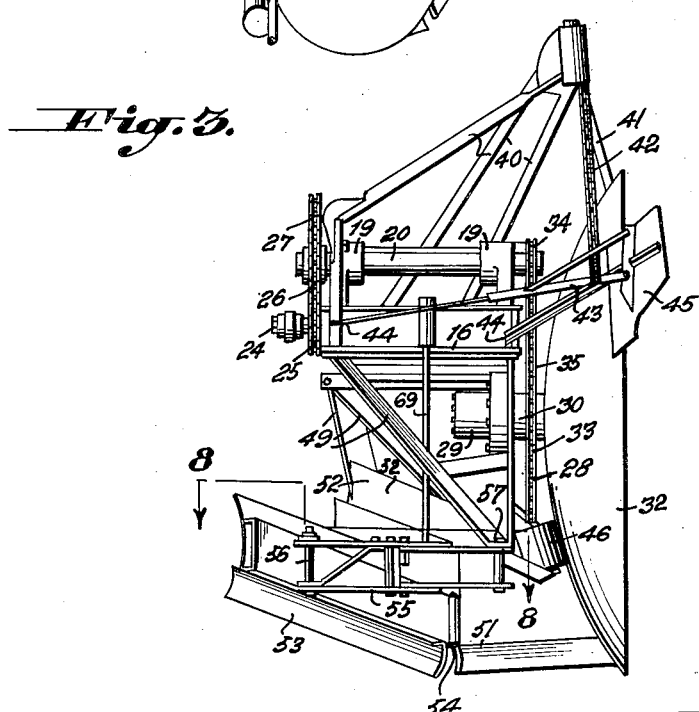
Figure 3 is a rear elevational view thereof taken at an oblique angle and looking substantially in the direction as indicated by the line 3—3 of Figure 4.

As best seen in Figures 1 and 3, the platform 16 is provided at its rear end with a depending hanger structure 28 containing bearings 29 and 30 for journaling one end of a short axle or shaft 31. A large disk blade 32 is mounted at its center on the opposite end of the axle 31 and fixed thereto for rotation with said axle. Said disk blade 32 has its concave side facing outwardly and forwardly with respect to the frame 11 and the convex side of said disk 32 extends into the recessed portion 18 of the frame platform 16. A large sprocket wheel 33 is fixed to the axle 31 between the bearing 30 and disk 32 and a small sprocket wheel 34 is fixed to the opposite end of the countershaft 20 above the sprocket wheel 33. The sprocket wheels 33 and 34 are connected by an endless chain 35. Accordingly, it will be readily apparent that the disk 32 will be driven from the drive shaft 22 but at a greatly reduced speed, preferably at approximately fifteen R. P. M. when the shaft 22 is revolved by the engine 21 at approximately twelve hundred R. P. M. The disk blade 32 is preferably approximately eight feet in diameter so that it will travel a distance of three hundred and ten feet per minute if in rolling contact with the earth and as the prime mover or tractor 14 is adapted to travel at the rate of one hundred and thirty two feet per minute, when the disk plow unit 10 is in operation, it will be readily apparent that the disk is moving at a faster rate of speed than the prime mover 14 and as said disk is revolved in the same direction as the unit 10 is traveling, the disk 32 in cutting into the earth will tend to propel the unit 10 in a forward direction to reduce the drag or load afforded by said unit on the tractor 14, as will hereinafter become more fully apparent. The concave side of the disk 32 has a depth of approximately sixteen inches and said disk 32 is capable of plowing to a depth of approximately five feet and is set at an angle to the longitudinal axis of the unit 10 so as to cut a furrow up to a width of sixty inches, when plowing at a maximum depth.

The frame 11 which is pivotally supported at its forward end on the trunnions 15 is adapted to be supported by the prime mover 14 with its rear end at different levels for varying the depth of penetration of the disk 32 and accordingly the width of a furrow formed thereby and which may be accomplished by providing a derrick frame or beam 36 which is anchored to and extends upwardly and rearwardly from the rear part of the tractor 14 and which carries pulleys 37 at its upper end. A sheave 38 is pivotally supported on the brace 17 and the pulleys 37 and the pulleys of the sheave 38 are connected by a cable 39, one end of which may be suitably anchored to the tractor 14 and which may be actuated in any suitable manner for raising or lowering the rear end of the frame 11, for supporting the unit 10 in an elevated, inoperative position as seen in Figure 1 or in a lowered position with the disk 32 penetrating the earth to a depth of as much as five feet. It will be readily obvious that the weight of the unit 10 will be substantially borne by the disk 32 when said disk is in a lowered position as the unit 10 provides the weight for holding the disk at a desired depth in the ground. A plurality of braces 40 are secured to and rise from the platform 16 adjacent its rear end and converge and join at their upper ends with one another and with a brace 41 which extends upwardly and rearwardly from the arm 13 and diagonal brace 17. A chain 42 is adjustably connected at one end thereof to the converging upper ends of the braces 40 and 41 and is connected at its opposite, lower end to a supporting structure 43 which is pivotally mounted at 44 on the rear end of the platform 16 and which extends rearwardly and diagonally therefrom. A moldboard 45 is secured to the free end of the supporting structure 43 and has it forward portion disposed along a portion of the convex side of the blade 32. The moldboard 45 extends from a trailing edge portion of the blade 32, as clearly illustrated in Figures 2 and 3 and by adjusting the supporting chain 42, the supporting structure 43 may be swung upwardly or downwardly for supporting the moldboard 45 at different levels with respect to the blade 32.

Two rollers 46 are journaled in bearings 47 which are secured to the lower portion of the hanger 28 and bear against the convex side of the blade 32 adjacent its bottom portion. A third roller 48 is journaled in a corresponding bearing 47 which is supported on the platform 16 and said roller 48 likewise bears against the convex side of the blade 32 and adjacent its forwardmost portion. The rollers 46 and 48 receive the thrust on the disk blade 32 to prevent a twisting strain being applied to the axle 31 when the blade 32 is forming a furrow.

The rear portion of the platform 16 is provided with a plurality of depending frame members or braces 49 which combine with the hanger 28 for supporting stationary blades 50, 51 and 52. The blades 50 and 51 have forward edges disposed adjacent the convex side of the blade 32 and forwardly of its axle 31 and said blades 50 and 51 extend rearwardly and diagonally away from the blade 32. A relatively long landside 53 is pivotally connected at its forward end at 54, as seen in Figure 3 to the rear end of the lower stationary blade 51. The landside 53 extends rearwardly from its pivot 54 and has its bottom edge disposed substantially in a plane parallel to the plane of the frame 11. A toggle joint 55 has one end pivotally connected at 56 to the landside 53, near its rear, free end and on the side thereof disposed adjacent the blade 32. The opposite end of the toggle joint 55 is pivotally mounted at 57 on the lower end of certain of said brace members 49 so that the pivot 57 provides a stationary anchor for the toggle joint 55. A control unit 58 includes spaced housing members 59 and 60. The housing member 59 is pivotally mounted at its outer end at 61 on a frame member 62 which is supported by certain of the braces 49 and the remote end of the housing section 60 is pivotally connected at 63 to the toggle joint 55 adjacent its knee pivot 64, as best seen in Figure 8. The housing sections 59 and 60 contain shafts 65 on which are journaled pulleys 66. A cable 67 is anchored at one of its ends to the housing 59 and is trained over the pulleys 66 of both housings 59 and 60 and extends from the housing 59 through an opening 68, as seen in Figure 6. The cable 67 may extend upwardly from the control unit 58 through a cable guide means 69 and thence along the platform 16 and around a pulley 70 which is supported in a bracket 71 which is hinged to the platform 16, as best seen in Figure 4. The opposite end of the cable 67, not shown, is adapted to terminate adjacent the operator's seat of the tractor 14 to be engaged and actuated by the tractor operator, as will hereinafter be described.

From the foregoing it will be readily apparent that the cable 39 can be slacked off to lower the frame 11 on its pivots 15 from its position of Figure 1 so that the blade 32 can penetrate the earth to any desired depth. The prime mover 14 is then driven forwardly or in a direction from right to left of Figure 1 and with the engine 21 in operation, the disk blade 32 can be revolved at a rate of approximately fifteen R. P. M. and so that it would ordinarily travel approximately three hundred and ten feet per minute if in rolling contact with the earth. The weight of the unit 10 will cause the disk blade 32 to cut into the earth to the depth allowed by the supporting cable 39 and as said disk 32 is revolving in a counterclockwise direction, as seen in Figure 1, it will tend to propel the unit 10 forwardly or in the direction of travel of the tractor 14. Assuming the blade 32 to be approximately eight feet in diameter and disposed at an angle as seen in Figures 2 and 4, said blade is capable of cutting a furrow up to five feet in depth and approximately five feet wide as the unit 10 is drawn along behind the tractor 14. The moldboard 45 may be adjustably positioned by the chain 42 to be disposed substantially at the level of the ground and so that the earth thrown from the trailing edge portion of the concave side of the disk blade 32 will be deflected by said moldboard 45 laterally away from the furrow. The pressure of the earth against the concave, forward side of the disk blade 32 will tend to cause the unit 10 to swing to the right looking from the front toward the rear thereof, as seen in Figure 2, and which would render it substantially impossible to steer the unit and the tractor 14 in a straight line without the landside 53 which functions as a rudder. It will be readily apparent that the landside 53 will engage the wall of the furrow formed by the leading edge portion of the blade 32 if said landside is disposed in alignment with the leading edge portion of the blade 32 and will thus resist any tendency of the unit 10 to be swung to the right as seen in Figure 2. The tractor operator by slacking off on the forward end of the cable 67 may in this manner permit the landside 53 to swing toward the blade 32 so that the landside will cease to counteract the pressure exerted on said blade so that the unit 10 will then be swung to the right, as seen in Figure 2, for causing the tractor 14 to be turned to the right, looking from the rear toward the front thereof. Conversely, by pulling on the cable 67 the control unit housing 60 will be drawn toward the housing 59 thereby exerting a pull on the toggle joint 55 adjacent its knee pivot 64 for tending to move the toggle joint toward a straight, extended position. Since the pivot 57 constitutes a stationary pivot of the toggle joint, the opposite end thereof which is pivoted at 56 to the landside 53 will be forced away from the pivot 57 thus swinging the landside 53 away from the blade 32 for forcing the landside outwardly and against the furrow wall, not shown, to thereby cause the unit 10 to swing in the opposite direction or toward the left, as seen in Figure 2, to cause the tractor 14 to be turned to the left, looking from the rear toward the front thereof. Accordingly, it will be readily apparent that the tractor operator may steer the tractor and the disk plow unit 10, drawn thereby solely by operation of the cable 67 from his seat on the tractor and while the blade 32 is in a lowered position for cutting a furrow.

Obviously, the unit 10 may be made in various sizes and the blade 32 may be made larger or smaller than the size mentioned. It will be readily apparent that with the disk blade unit 10 a deep and wide furrow may be very rapidly formed thus making it possible to accomplish deep plowing and soil declaiming much more rapidly and at a greatly reduced cost as compared with the work which can be accomplished by conventional plowing units.

Various modifications and changes are contemplated and may obviously be resorted to, without departing from the spirit or scope of the invention as hereinafter defined by the appended claims.

I claim as my invention:

1. A driven disk plow unit attachment for prime movers comprising, a frame having forwardly extending transversely spaced arms adapted to straddle the rear portion of a prime mover and pivotally connected thereto at the forward ends of said arms for vertical swinging movement of the frame, said frame extending rearwardly beyond the rear end of the prime mover, a large disk blade rotatably supported by said frame and disposed on one side thereof and at an oblique angle to the direction of travel of the prime mover, said disk blade having an outwardly and forwardly facing concave side, an engine mounted on said frame, reduction driving means supported by and journaled on said frame for driving the disk blade from said engine at a reduced speed for rotation of the disk blade in the same direction as the surface engaging elements of the prime mover, a furrow wall engaging guide member swingably supported at its forward end on the frame for swinging movement toward and away from the opposite, convex side of the disk blade, said guide member having its forward end disposed behind the forwardmost portion of the disk blade and adjacent the bottom portion of said disk blade and having an outer furrow wall engaging surface disposed in a vertical plane and normally disposed substantially parallel to the direction of travel of the prime mover and substantially in longitudinal alignment with the leading edge portion of the disk blade, and manually actuated means pivotally connected to the frame and guide member for swinging the trailing, free end of said guide member away from the disk blade for cooperation with the furrow forming disk blade in steering the prime mover.

2. A driven disk plow unit as in claim 1, said last-named means including a toggle joint having one end pivotally connected to a stationary part of the frame and an opposite end pivotally connected to the guide member remote from its pivot, and manually actuated flexible means for exerting a pull on the toggle joint adjacent its intermediate knee pivot for extending the toggle joint.

3. A driven disk plow unit as in claim 1, a moldboard, a support for said moldboard pivotally mounted on the frame for supporting the moldboard with a portion thereof adjacent the convex side of the disk blade and with another portion thereof extending from the disk blade adjacent a portion of its trailing edge, and means for adjustably supporting the moldboard at different levels relatively to the disk blade.

4. A driven disk blade unit as in claim 1, and derrick means for raising and lowering the frame on its pivot and for supporting the rear end of the frame at different elevations relatively to the prime mover, said derrick means including a beam supported on and rising from the prime mover.

5. A driven disk plow unit attachment for prime movers comprising an elongated frame having a forward end straddling and detachably connected to the rear portion of a prime mover, said frame having a rear portion disposed obliquely to the longitudinal axis of said unit, a large disk blade rotatably supported by said obliquely disposed frame portion in substantially a vertical plane and substantially parallel to said obliquely disposed frame portion, said disk blade having a concave side facing away from the diagonal frame portion and toward the forward end of the frame, said rear frame portion constituting a platform disposed above the level of the axis of the disk blade, an engine mounted on said platform, and driving means connecting said engine to the disk blade between the platform and the convex side of the blade for driving the disk blade at a reduced speed and at variable speeds relatively to the engine speed and in a direction corresponding to the direction of rotation of the surface engaging elements of the prime mover, the rear end of said frame being disposed at a level for causing the disk blade to engage the earth behind the prime mover for cutting a wide and deep furrow.

6. A power driven disk blade unit as in claim 5, a moldboard support extending rearwardly from said frame, a moldboard mounted on the outer end of said support and having a forward portion disposed behind a portion of the convex side of the disk blade and a trailing portion extending rearwardly from a portion of the trailing edge portion of said disk blade, said moldboard being disposed substantially parallel to the convex side of the trailing portion of the disk blade and having its trailing portion crossing the plane of the concave side of the disk blade behind and adjacent said trailing edge portion of the disk blade.

7. A driven disk plow unit as in claim 5, a furrow wall engaging guide member having a forward end pivotally supported on said frame adjacent the level of the lower portion of the disk blade and behind and adjacent the convex side thereof and rearwardly of the leading edge portion of said disk blade, and manually actuated means for swinging said guide member away from the disk blade, said guide member having an outer surface disposed in substantially a vertical plane.

8. A driven disk plow unit as in claim 5, a furrow wall engaging guide member having a forward end pivotally supported on said frame adjacent the level of the lower portion of the disk blade and behind and adjacent the convex side thereof and rearwardly of the leading edge portion of said disk blade, and manually actuated means for swinging said guide member away from the disk blade, said guide member having an outer surface disposed in substantially a vertical plane, said manually actuated means including a toggle joint having one end pivotally mounted on a stationary part of the frame and an opposite end pivotally connected to the inner side of the guide member adjacent its trailing, free end.

FREDERIC M. JONES.

REFERENCES CITED

The following references are of record in the file of this patent:

UNITED STATES PATENTS

| Number | Name | Date |
| --- | --- | --- |
| 425,210 | Cobb | Apr. 18, 1890 |
| 657,204 | Poole | Sept. 4, 1900 |
| 1,051,624 | Nilson | Jan. 28, 1913 |
| 1,848,933 | Brown | Mar. 8, 1932 |
| 2,063,584 | Collins | Dec. 8, 1936 |
| 2,310,735 | Greer | Feb. 9, 1943 |
| 2,410,273 | Deubner | Oct. 29, 1946 |